(12) United States Patent
Hamilton et al.

(10) Patent No.: US 7,872,444 B2
(45) Date of Patent: Jan. 18, 2011

(54) OPPORTUNISTIC POWER SUPPLY CHARGE SYSTEM FOR PORTABLE UNIT

(75) Inventors: Alistair Hamilton, Stony Brook, NY (US); Raj Bridgelall, Mount Sinai, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 664 days.

(21) Appl. No.: 10/733,221

(22) Filed: Dec. 11, 2003

(65) Prior Publication Data

US 2005/0127866 A1 Jun. 16, 2005

(51) Int. Cl.
*H02J 7/00* (2006.01)
*H02J 7/04* (2006.01)

(52) U.S. Cl. .............. 320/108; 320/127; 320/133; 320/137

(58) Field of Classification Search ............. 320/108, 320/113, 115, 155, 156, 127, 133, 137; 235/462.44, 235/462.45
See application file for complete search history.

(56) References Cited

U.S. PATENT DOCUMENTS

| | | | |
|---|---|---|---|
| 4,054,826 A | | 10/1977 | Wahlstrom et al. |
| 5,070,293 A | * | 12/1991 | Ishii et al. .............. 320/108 |
| 5,600,225 A | * | 2/1997 | Goto .................... 320/108 |
| 5,677,944 A | | 10/1997 | Yamamoto et al. |
| 5,805,998 A | * | 9/1998 | Kodama ................ 455/462 |
| 5,914,585 A | | 6/1999 | Grabon et al. |
| 5,986,433 A | | 11/1999 | Peele et al. |
| 6,011,379 A | | 1/2000 | Singh et al. |
| 6,016,046 A | * | 1/2000 | Kaite et al. ............ 320/108 |
| 6,114,832 A | * | 9/2000 | Lappi et al. ............ 320/108 |
| 6,184,651 B1 | * | 2/2001 | Fernandez et al. ........ 320/108 |
| 6,327,127 B1 | * | 12/2001 | Utsunomiya et al. ...... 361/92 |
| 6,489,745 B1 | * | 12/2002 | Koreis .................. 320/108 |
| 6,608,464 B1 | * | 8/2003 | Lew et al. .............. 320/107 |
| 6,917,182 B2 | * | 7/2005 | Burton et al. ........... 320/108 |
| 2003/0210106 A1 | * | 11/2003 | Cheng et al. ........... 334/24 R |
| 2009/0072788 A1 | | 3/2009 | DeLaille et al. |

FOREIGN PATENT DOCUMENTS

| | | |
|---|---|---|
| EP | 03111460 | 10/1988 |
| EP | 0385502 A | 9/1990 |
| WO | 2008002607 | 6/2007 |

OTHER PUBLICATIONS

B. Krasser. European Search Report. EPO, Munich, 2005. 2 pages.

(Continued)

*Primary Examiner*—Edward Tso
*Assistant Examiner*—Alexis Boateng

(57) ABSTRACT

Systems and methods for opportunistically charging a rechargeable power source of a portable electronic unit are provided. The system includes a primary inductance assembly energized by a main power source for inducing an electro-magnetic flux in a secondary coil assembly associated with a power source of the portable unit. Such electro-magnetic flux creates an electric current that is subsequently employed for charging the power source of the portable unit. A controller of the charging system can monitor state of charge, and notify a user when a recharge is required. Scavenging modes may also be employed for recharging the main power source and the rechargeable source of the portable unit.

26 Claims, 10 Drawing Sheets

OTHER PUBLICATIONS

Starner, T., "Human Powered Wearable Computing," IBM Systems Journal, vol. 35, No. 3 & 4, 1996.

EPC Office Action for Application No. 04029343.3-2207 dated Oct. 15, 2009, a foreign counterpart of U.S. Appl. No. 10/733,221.

China Office Action dated Jan. 9, 2009 for Chinese Application No. 200410099798.6, foreign counterpart of U.S. Appl. No. 10/733,221.

English translation of China Patent Office Action dated Jan. 9, 2009 for Chinese Application No. 200410099798.6, foreign counterpart of U.S. Appl. No. 10/733,221.

* cited by examiner

Body Part

OPPORTUNISTIC POWER SUPPLY CHARGE SYSTEM FOR PORTABLE UNIT

TECHNICAL FIELD

The present invention relates to charging energy storage components of portable units, and more particularly relates to systems and methods of periodically and/or opportunistically charging such energy storage components at selected intervals.

BACKGROUND OF THE INVENTION

Typically there is a desire to reduce size of electronic units, while lowering associated costs. Many such electronic units, such as portable or hand held electronic devices, e.g., cellular phones, laptop computers, bar code scanners and the like can include various replaceable battery arrangements having electrical/mechanical contacts that are subject to wear and tear during a lifetime of the electronic unit. For example, such battery arrangements can include rechargeable battery packs comprised of battery cells.

Generally, when one battery unit or a battery cell of such a pack is depleted, it can be removed from the host unit and replaced with another fully charged battery cell, with the depleted battery unit or cell being recharged or disposed of. Such battery pack arrangement can typically include a sealed enclosure, which protects the rechargeable batteries cells. Contacts on an exterior surface of the battery pack enclosure mate with contacts on the electronic device or interior terminal contact, upon the battery pack being mounted on the electronic device. Such battery packs may be arranged in two or three rows, depending on the capacity required of the whole battery pack, capacity and size of each battery, and similar factors. Charging or discharging batteries of these devices requires use of various conducting parts for electrical connection between the batteries and between package terminals and the batteries. Such conducting members are typically subject to wear and tear, which in a life time of the electronic unit can affect performance thereof as well as that of the portable unit.

At the same time, the market for wearable systems of portable unit/computer is rapidly expanding. Such systems have architectures wherein main components of the system are generally supported by and/or upon a user's body. As such, a user of a wearable computer may be termed the 'wearer' of the computer or portable unit.

Such units typically enable a user to freely employ hands or other body parts when operating the unit. Wearable computer (or portable data collection devices) form factors typically include belt/head worn products—which can come equipped with a head mounted display, as well as headset microphone and/or tablet display—and wrist/finger-worn devices that are usually associated with a bar code scanner and a voice or touch screen interface. Such portable data collection devices are widely used in manufacturing, service, and package delivery industries as to perform a variety of on-site data collection activities, including; integrated bar code dataform readers adapted to read bar code dataforms affixed to products, product packaging and/or containers in warehouses, retail stores, shipping terminals, or the like, for inventory control, tracking, production control and expediting, quality assurance and a wide variety of other purposes.

Desirable characteristics of a rechargeable power supply for such units, as well as for other portable electronic units, include; lightness, rapid charging rate, performance at low charge, ability to be charged and discharged many times without deterioration, and calendar lifetime. Typically however, providing a long battery life for portable electronic units substantially increases weight of the portable unit, such that they become heavy and cumbersome to operate.

Therefore, there is a need to overcome the aforementioned deficiencies associated with conventional devices.

SUMMARY OF THE INVENTION

The following presents a simplified summary of the invention in order to provide a basic understanding of one or more aspects of the invention. This summary is not an extensive overview of the invention. It is intended to neither identify key or critical elements of the invention, nor to delineate the scope of the present invention. Rather, the sole purpose of this summary is to present some concepts of the invention in a simplified form as a prelude to the more detailed description that is presented hereinafter.

The present invention provides for systems and methods of periodically and/or opportunistically charging energy storage component(s) or a power supply of a portable unit at; desired, predetermined or random time intervals. According to one aspect of the present invention, charging of energy storage component occurs inductively via a non electrical contact process with a charger system, when the host portable unit is subjected to the electromagnetic field of the induction process. The rechargeable power supply or energy storage components can include; rechargeable batteries, fuel cells, capacitors, high capacity capacitors, super capacitors and the like. Yet, the present invention is not so limited, and can also be employed for other types of power sources.

In one aspect according to the present invention, the charger system includes a primary inductance component, which induces an electromagnetic flux within a secondary assembly that is operatively connected to a portable unit. The primary inductance component can include a primary winding element and is energized by a primary power supply. The secondary assembly includes a secondary or pick-up winding element and a rectifier, operatively connected to the rechargeable power supply of portable unit. The charger system induces a magnetic flux that creates an alternating current in the secondary winding of the secondary induction assembly. The converter can convert the induced alternating current to direct current, which is then employed for charging the rechargeable source of the portable unit. Such opportunistic charging according to one aspect of the present invention provides for an expedient partial or full charge of the rechargeable power supply of the portable unit, during a substantially short period or immediately upon induction.

In another aspect of the present invention, charger system can include a controller that monitors state of charge of the portable unit. Such controller can then notify a user of requirement for charging the portable unit based on its state of charge. When a user simultaneously employs several portable units that require charging, the controller can additionally determine intervals of required charging time for each portable unit and accordingly, allocate a charge time slot for each unit. User can then initiate respective recharge process for each portable unit based on notification from the controller.

In another aspect of the present invention, a controller can modify operation of the charging system based on a predetermined criteria and respond accordingly. Such modifications for example, can be based on; an algorithm for a user's body motion, proximity of the portable unit to the charger system, light or sound variation, type of portable unit or power supply to be charged, and the like, with the controller including sensors such as; motion sensors, light and sound sensors, voltage and current measurement components and the like.

According to one aspect of the present invention, a user of portable unit wears the charger system and opportunistically charges the portable unit during intervals of use, as well as during periods of non-use. For example, the portable unit can be a cordless ring scanner having a rechargeable energy storage component with sufficient power for only a few scans. Such power supply of the ring scanner eventually becomes depleted after several scans, and needs to be recharged periodically. The user can then opportunistically recharge the ring scanner at desired intervals. In a related aspect of the present invention, the primary inductance component can be positioned on a user's wrist, or woven in to a wearable fabric, such as part of glove or a shirt.

In another aspect of the present invention, the charging system can be a holster for carrying the portable unit. A primary battery pack with primary charging coils can be part of an interior of the holster. When the charging coil in the battery charger is energized, the charging coil creates magnetic flux lines. The portable unit with its rechargeable battery pack is positioned within the holster and in proximity to the battery charger in a non-direct electrical contact relationship with respect thereto. The rechargeable battery pack includes a pick-up coil which will have an electrical current induced therein upon the battery pack being positioned adjacent the battery charger and the battery charger being energized. The rechargeable battery pack can include a circuit for rectifying the induced current in the pick-up coil to charge the battery cells in the battery pack. The circuit can include a rectifier and a current limiting resistor, so that the rechargeable battery is self-regulating in terms of current and overcharge. In addition, losses, and consequently heating, can be reduced by design of the coils and their location within the holster. The AC resistance losses (the eddy current losses) are reduced by reducing the number of consecutive layers in the axial direction of the magnetic field. Also, by separating the coil layers, in both the primary and secondary assemblies, a greater surface area is achieved, so that there is increased surface area across which cooling air may flow.

In accordance with another aspect of the invention, several charging assemblies, having various configurations, such as a flat pad, cylindrical and other three-dimensional shapes can be provided as part of a user's vest, back pack, e.g., a military back pack, or the like for recharging portable units that are carried by a user. In a related aspect of the present invention, one member of a group can serve as the carrier of the recharging system, with other members of the group approaching such carrier whenever a respective recharge is required.

According to another aspect of the present invention, both the rechargeable power unit and the primary power supply may employ other scavenging techniques for recharge, such as body heat, foot pressure, solar energy, and the like for recharging their respective power supply.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings. To facilitate the reading of the drawings, some of the drawings may not have been drawn to scale from one figure to another or within a given figure.

DETAILED DESCRIPTION OF THE INVENTION

Figure 1:
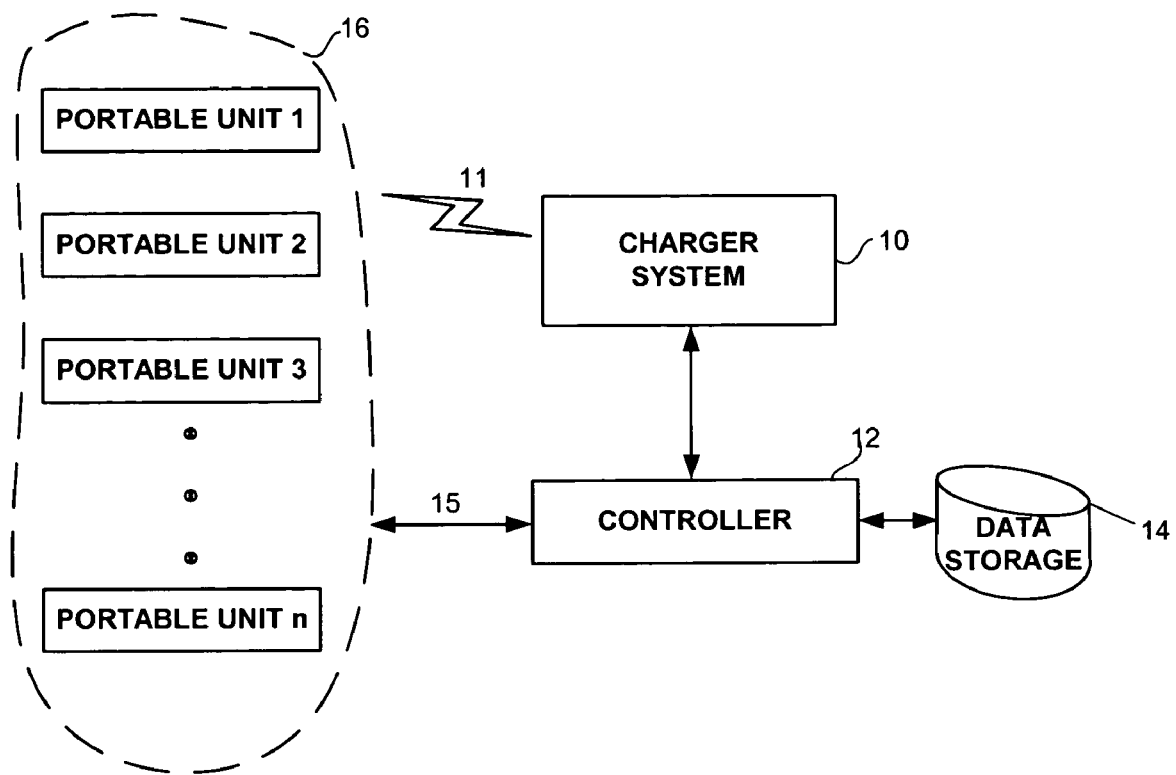
FIG. 1 illustrates a schematic diagram of units utilizing a charging system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. It is to be appreciated that filters, minifilters, filter managers, classifiers, models, order groups and other various items are components.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The subject invention (e.g., in connection with charging a rechargeable power supply) can employ various artificial intelligence based schemes for carrying out various aspects thereof. For example, a process for learning explicitly or implicitly when a device requires or should be charged can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, with respect to SVM's that are well understood, SVM's are configured via a learning or training phase within a classifier constructor and feature selection module. A classifier is a function that maps an input attribute vector, x=(x1, x2, x3, x4, xn), to a confidence that the input belongs to a class—that is, f(x)=confidence(class). A schematic diagram of units utilizing a charging system in accordance with an aspect of the present invention is illustrated in FIG. 1. The system includes a charger assembly 10 that provides a charge 11 to portable unit (s) 16 ("n" being a positive integer). The portable unit(s) 16 can be part of a body area network (BAN) that generally includes wearable communication ports and appliances connected to a centrally networked controller. The ports and/or the appliances can be positioned on substantially any suitable part of the body. The ports can include for example, bracelets, necklaces, watches, anklets, pocket locations and the like. Generally, function of such port(s) can depend on the appliance or portable unit that the port(s) communicates with and is operatively connected to.

The portable unit(s) 16 can host a power storage component that can be recharged periodically. Such power storage component can include, for example: rechargeable batteries, fuel cells, capacitors, high capacity capacitors, super capacitors and the like, or any other energy storage component capable of storing energy and releasing it as to create an electrical current. According to one aspect of the present invention, such storage component(s) of portable units 16 can be recharged periodically via a "non-direct electric contact" charge induction 11.

The portable unit(s) 16 employing such induction mechanism may require various levels of charging attention depending upon their application. For example, a ring scanner may have a storage component capable of storing energy for only ten scan operations before energy depletion, while a head set, on the other hand, may not require as frequent a charging as the ring scanner. A controller 12 can monitor state of charge of the portable unit(s) and notify its user of requirement for charging the portable unit based on its state of charge. Moreover, when a user employs several portable units, the controller 12 can additionally determine intervals of required charging time for each portable unit and accordingly, allocate a charge time slot for each unit. The user can then initiate respective recharge process for each portable unit based on notification from the controller 12. Also, the controller 12 can be configured to modify operation of the charging system based on specified criteria and respond accordingly. Such modifications, as discussed infra can be based on; e.g., an algorithm for a user's body motion, proximity of the portable unit to the charger system, light or sound variation, type of portable unit or power supply to be charged, and the like, with the controller including sensors such as; motion sensors, light and sound sensors, voltage and current measurement components and the like.

Figure 2:
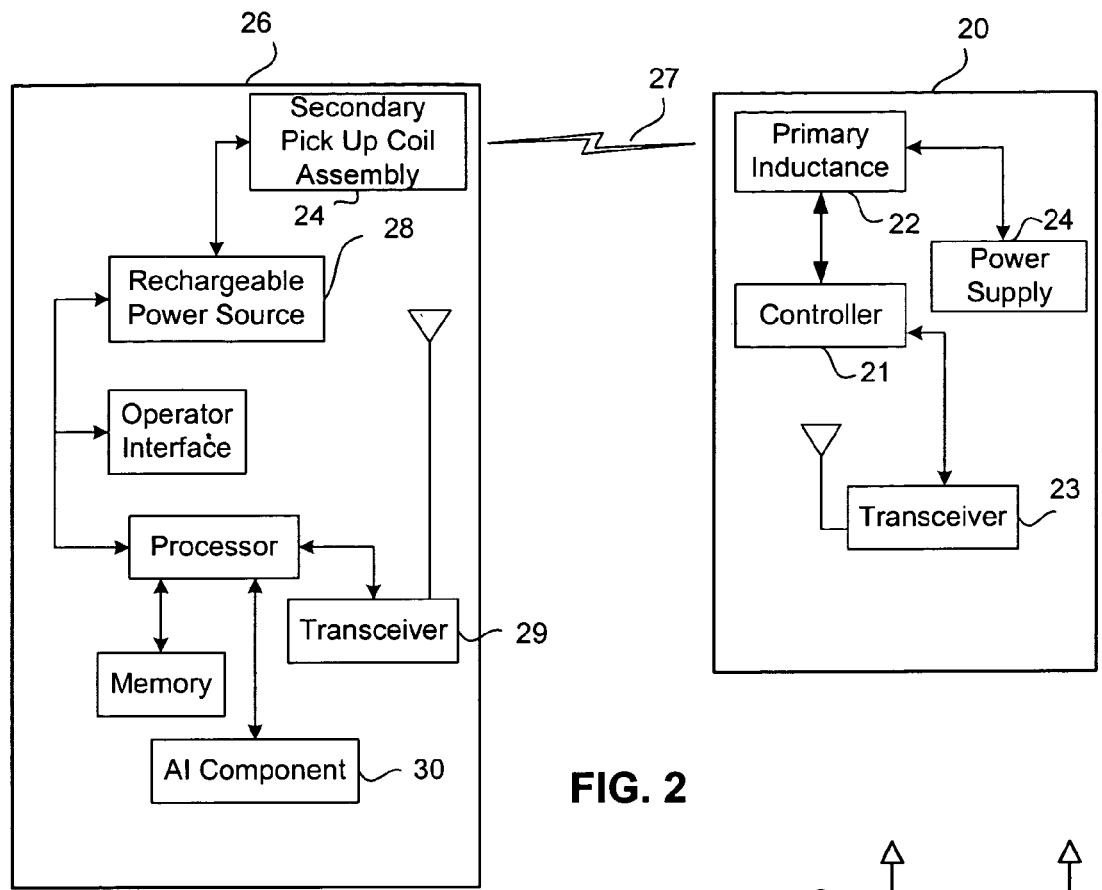
FIG. 2 is a block diagram illustrating an induction system according to one aspect of the present invention.
Figure 3:
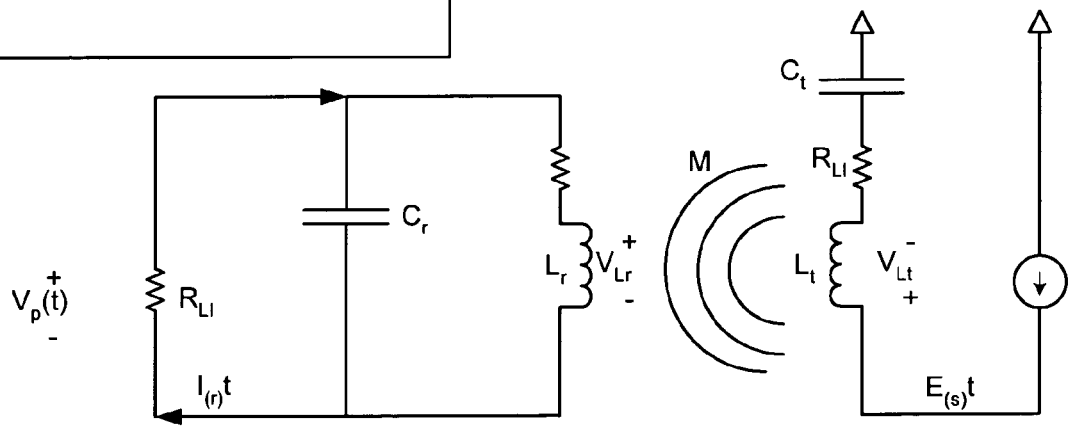
FIG. 3 illustrates a circuit configuration for inducing electromagnetic flux according to one aspect of the present invention.

FIGS. 2 and 3 illustrate a block diagram and a circuit diagram for several components of a charger system according to one exemplary aspect of the present invention. The charger system 20 includes a controller 21 coupled to a primary inductance component 22 for inducing a magnetic flux 27 in a secondary coil assembly 24 associated with the portable unit 26. The transmitting network for the inductive coupling 27 between the primary assembly 22 and secondary assembly 24, can be a constant current drive circuit configuration as illustrated in FIG. 3. The primary inductance component 22 includes an induction assembly having a coil arrangement $L_t$. When coil arrangement $L_t$ in the induction assembly 22 is energized via the main power supply 24, the charged coil creates magnetic flux lines M. The pick up secondary assembly 24 includes a secondary core, a winding element $L_r$, and a rectifier (not shown), operatively connected to the rechargeable power supply 28 of portable unit. Accordingly, rechargeable power source 28 of portable unit 26 is in a non-direct electrical contact relationship with the primary induction assembly 22. The power source 28 with the pick up coil will have an electrical current $I_r(t)$ induced therein when the power source 28 is positioned in proximity to the charger system 20 with its coil arrangement energized by power supply 24. The rechargeable power source 28 includes a circuit arrangement for rectifying the induced current in the pick up coil to restore power within the rechargeable storage component 28. The circuit arrangement can include a rectifier (not shown) and a current limiting resistor, so that the batter is self regulating in terms of current and over charge. All such functions can be controlled from the portable unit 26 and/or the controller 21 via transceiver 23 in RF communication with transceiver 29. Other wireless communication systems, (e.g. infrared) may also be employed.

Moreover, losses, and consequently heating, can be reduced by suitable design and positioning of the coils or winding elements of the primary and secondary assemblies. The AC resistance losses (the eddy current losses) are reduced by reducing the number of consecutive layers in the axial direction of the magnetic field. By separating the coil layers, in both the primary and secondary assembly, a greater surface area is achieved so that there is increased surface area across which cooling air may flow.

The magnetic coupling is enhanced between the inductive charge coupler 22 and the inductive charge receptacle 24 by the thinness, in the axial direction, of the electrical windings in both the coupler and receptacle. It is noted that the AC resistance $R_{ac}$ of windings can be very much higher than the DC $R_{dc}$ resistance depending on the frequency, winding geometry and the thickness of the layers.

In general, it can be noted that, when the thickness of the winding layer is small compared to the skin depth at the operating frequency, the ratio of $R_{ac}/R_{dc}$ is essentially one. However, as the winding layer thickness approaches the skin current thickness, the ratio rapidly rises, especially when the number of winding layers is larger than one. Accordingly, in one aspect of the present invention, in order to minimize loss, the number of layers in the axial direction of the magnetic field can be minimized, via for example, dividing the primary inductance into several windings and providing for corresponding secondary windings.

Moreover, the coils associated with the inductor 22 or the portable unit 24 can be formed integrally with the respective components. For example, the coils can be etched and/or plated, or in the alternative, the coil can be physically separate from the associated component.

For a ring scanner portable unit, transmitting coil can include a transmitting coil with a 2" radius having 145 numbers of turns, and an inductance of $L_t$ of 2.213 mH. The receiving coil can have a radius of 0.785 inches with 9.7 numbers of turns and an inductance $L_r$ of 3.63 µH and a coil resistance of 6.35 m Ohm. The maximum source voltage and maximum safe current can be limited to 5 volt and 91.4 mAmps respectively. Thus, an arrangement according to the present invention enables a portable unit, e.g. ring scanner to operate by employing a substantially small power supply component, as a user may opportunistically and inductively recharge the power supply at desired and/or predetermined intervals.

As shown in FIG. 2, an artificial intelligence (AI) component 30 can be employed to facilitate inferring and/or determining when, where, how . . . to effect re-charging in accordance with the subject invention. The AI component 30 can employ any of a variety of suitable AI-based schemes as described supra in connection with facilitating various aspects of the herein described invention.

Figure 4:
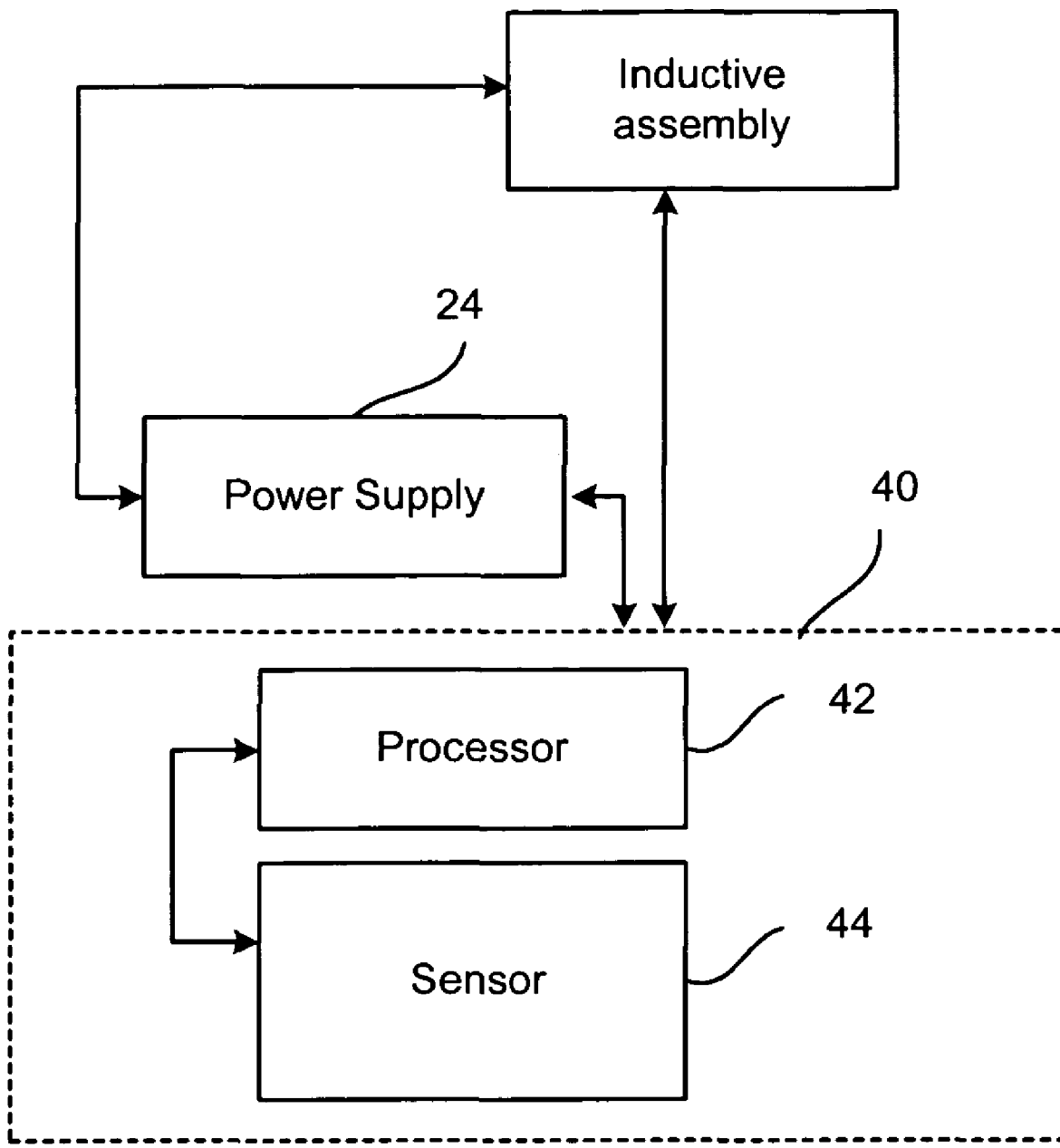
FIG. 4 is a block diagram of a controller according to one aspect of the present invention.

Referring now to FIG. 4, a block diagram for a controller as part of the charging system is illustrated according to one aspect of the present invention. A controller 40 monitors state of charge of the portable unit and can notify its user of requirement for charging the portable unit based on its state of charge. Moreover, when a user employs several portable units according to the present invention, the controller can additionally determine intervals of required charging time for each portable unit and accordingly, allocate a charge time slot for each unit. The user can then initiate respective recharge processes for respective portable units based on notification from the controller 40. Such notification can be in a form of an electric stimulus, visual and/or auditory signal, or the like.

As part of the controller 40, a processor 42 and a sensor component 44 can be provided, which activates power induction from the charger system to the portable unit, upon occurrence of a triggering event. Such triggering event can be based on a predetermined algorithm, such as for example one based on: a user's body motion, or proximity of portable unit to be charged to the charger system, light or sound variation, and the like.

For example, a user wearing a ring scanner can place the hand wearing the ring scanner within three inches of the charging system, affecting a light or motion sensor component of the controller and thereby activating a respective power induction burst. The sensor also deactivates the power induction upon removal of the triggering event or after a predetermined interval. The controller can also emit a notifying signal, e.g., a noise, light, or the like, to indicate when power induction is activated due to the detection of the triggering event, e.g., motion by the sensor. Such notifying signal can also be transmitted to a display of the portable unit hosting the power supply inductively recharged. In another example, the controller 40 can detect an arm movement of a user, as to initiate a power burst when user waves and/or wipes the ring scanner by the charger.

In a related aspect according to the present invention, the processor 42 can draw power from a power supply and distributes power 24 to several portable units, when such unit is placed in a holster or back pack arrangement as discussed infra. In addition, such distribution of power can equalize state of charge in portable units, by providing or blocking further charging current, so that functionality of portable units is maintained should there be a functional dependency of portable units on each other. Such power distribution scheme can be provided, for example when a user carries portable units in a vest, holster or back pack assembly. Accordingly, the controller can be configured to respond to the state of charge of the other portable units employed by a user, and modify its response accordingly.

Figure 5:
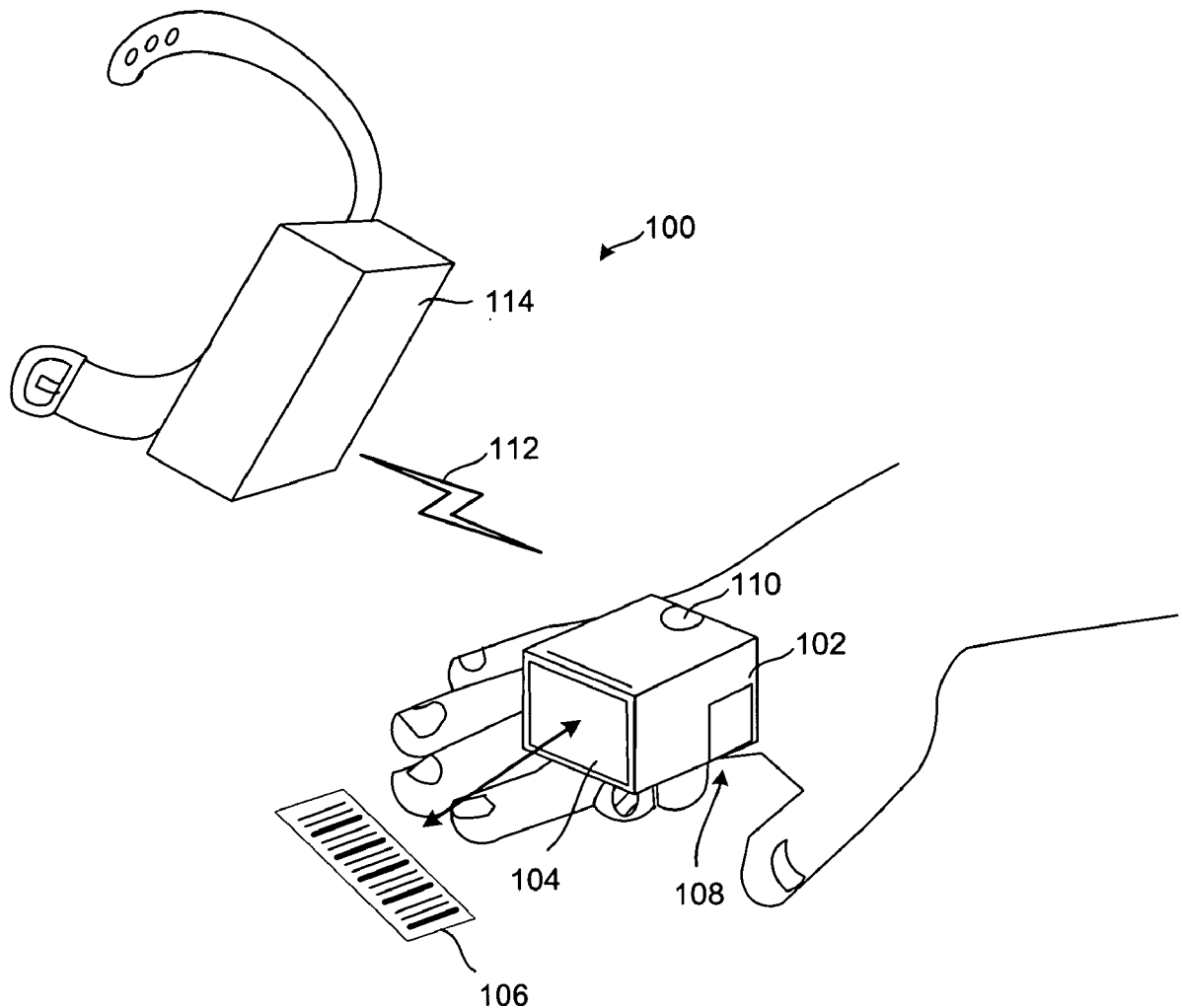
FIG. 5 illustrates an induction arrangement for a ring scanner according to one particular aspect of the present invention.

FIG. 5 illustrates an induction arrangement 100 according to one aspect of the present invention. A charge assembly 100, wearable for example around a waist line of a user, is employed for an inductive charging 112 of a wearable portable unit having a rechargeable power supply. In this particular aspect, the wearable portable unit is a ring scanner. The ring scanner 102 can be strapped onto one or more fingers of a user—as illustrated the index and middle fingers—and oriented such that a scanning portal 104 through which scanning head electronics (or reading apparatus) faces away from the user and toward a readable dataform 106, e.g., a bar code. The scanning head electronics (not shown) scans the readable dataform 106 through the portal 104. The ring scanner 102 comprises a rechargeable power supply 108, which can be opportunistically recharged via charger 114 at selected intervals. Such power supply 108 is operatively connected to a pickup coil arrangement and RLC circuit with a rectifier (not shown). During opportunistic recharging 112 of power supply 108, an electromagnetic flux is induced in the pick up coil of rechargeable power supply 108 via the charging assembly 114 that can be worn around a user's waist. Such induced flux creates an electric current, subsequently rectified and employed for re-charging the battery pack 108.

The charging assembly 114 can include a primary battery, also worn around a user's waist. The charger assembly 114 includes a primary inductance component (not shown) that induces an electromagnetic flux into the pick up coil assembly of the scanner. The primary inductance component includes an induction assembly having a coil arrangement (not shown). When such coil arrangement in the induction assembly is energized via a main power supply worn around the waist, then the charging coil creates magnetic flux lines. Such power transmitting network for the inductive coupling between the primary assembly and the portable unit can be a fixed voltage drive or constant current drive circuit configuration. The magnetic fluxes are then acquired by the pick up coil, when the portable unit is positioned at a predetermined distance and/or wiped upon or waved by the charging assembly. The charger assembly 114 can also include a controller, which as described supra, monitors state of charge of the ring scanner and notify its user of requirement for charging the scanner's based on its state of charge. The user can then position the ring scanner next to the charging assembly and opportunistically recharge its battery source 108. This allows for a substantially lighter battery source to be employed as part of ring scanner, thus facilitating its ease of use.

The rechargeable battery pack 108 can include a view port 110 through which the user can view a light emitted from an internal light source. The light source can comprise LEDs (Light Emitting Diodes) associated for example with a particular status of the charge of power source 108 and/or scanning operation. In addition, other auditory notification schemes can be employed with the charge status of the rechargeable battery and/or the scan read.

In a related aspect of the present invention, the user will perceive the green light through the view port 110 of the battery pack 108, if a successful induction charge has occurred when the portable unit is brought in close proximity to the charger 114. In addition, a green light may be displayed when scanner's rechargeable battery 108 is at a full state. Alternatively, if an induction charge is unsuccessful, and/or when a low battery level is at a critically low level, the user will perceive the red light through the view port 110. Moreover, power depletion of ring scanner's rechargeable battery to a predetermined level can also initiate a specific stimulus notifying a user, e.g., a specific LED color or auditory tone. In one related aspect, the controlled confirmations provided by the LEDs and/or audio transducer can be activated in various combinations or singularly, at the discretion of the operator.

Similarly, a user can be notified of read scan status through LEDs, e.g., normal operation produces a steady green light, while a successful read maintains the green light, and additionally activates a high beep in combination therewith. An unsuccessful read operation could then cause deactivation of the green light, activation of a red light, and activation of the audio transducer to a produce a low beep. It is to be appreciated that other alerting mechanism for notifying a user of the read scan or battery charge status can also be employed, e.g., independent series of same frequency tones or a combination of multi-frequency tones can be used to indicate a different status of charging and/or power depletion of scanner's rechargeable battery. Additionally, the LEDs need not be separate devices, but can be a multi-color LED device in a single case (e.g., a red/green/blue device or bi-color red/green device), or a flasher LED that includes a built-in chip for controlling a flashing function according to the corresponding status. Once the dataform 106 has been scanned, data representative of the scanned dataform is communicated wirelessly over a wireless communication link 112 to a remote data collection unit, which can also be part of the charger 114.

Figure 6:
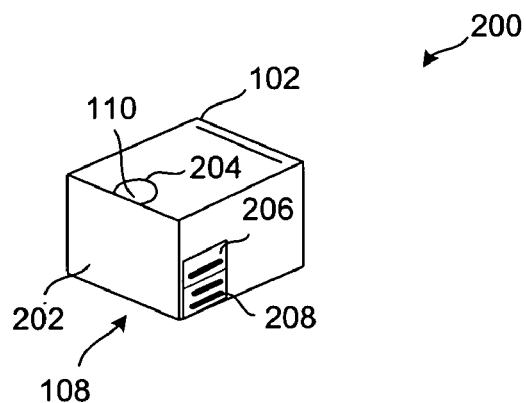
FIG. 6 illustrates a perspective view of the ring scanner that employs a charging system according to one aspect of the present invention.

Referring now to FIG. 6, there is illustrated a rear view isometric 200 of the ring scanner 102 of FIG. 5. The scanner 102 comprises a case 202 that houses electronics required to perform rectification of the current created by induced magnetic flux, as well as the scanning and communication operations. The case 202 is suitably designed to receive the rechargeable battery pack 108 with recharging coil circuit. To facilitate viewing of the light source from the battery pack 108, the case 202 includes a view port hole 204 in which the view port 110 is aligned to allow the user to perceive the light emitted from the light sources internal to the rechargeable battery pack 108. The case 202 also includes latch openings 206 on either side of the case 202 for accommodating compressible latches 208 on either side of the rechargeable battery pack 108, for engaging the corresponding latch openings 206 from underneath the case 202 to secure the battery pack 108 within a case 202. The scanner 102 can also include straps for strapping the scanner 102 onto the backside of the two fingers.

Figure 7:
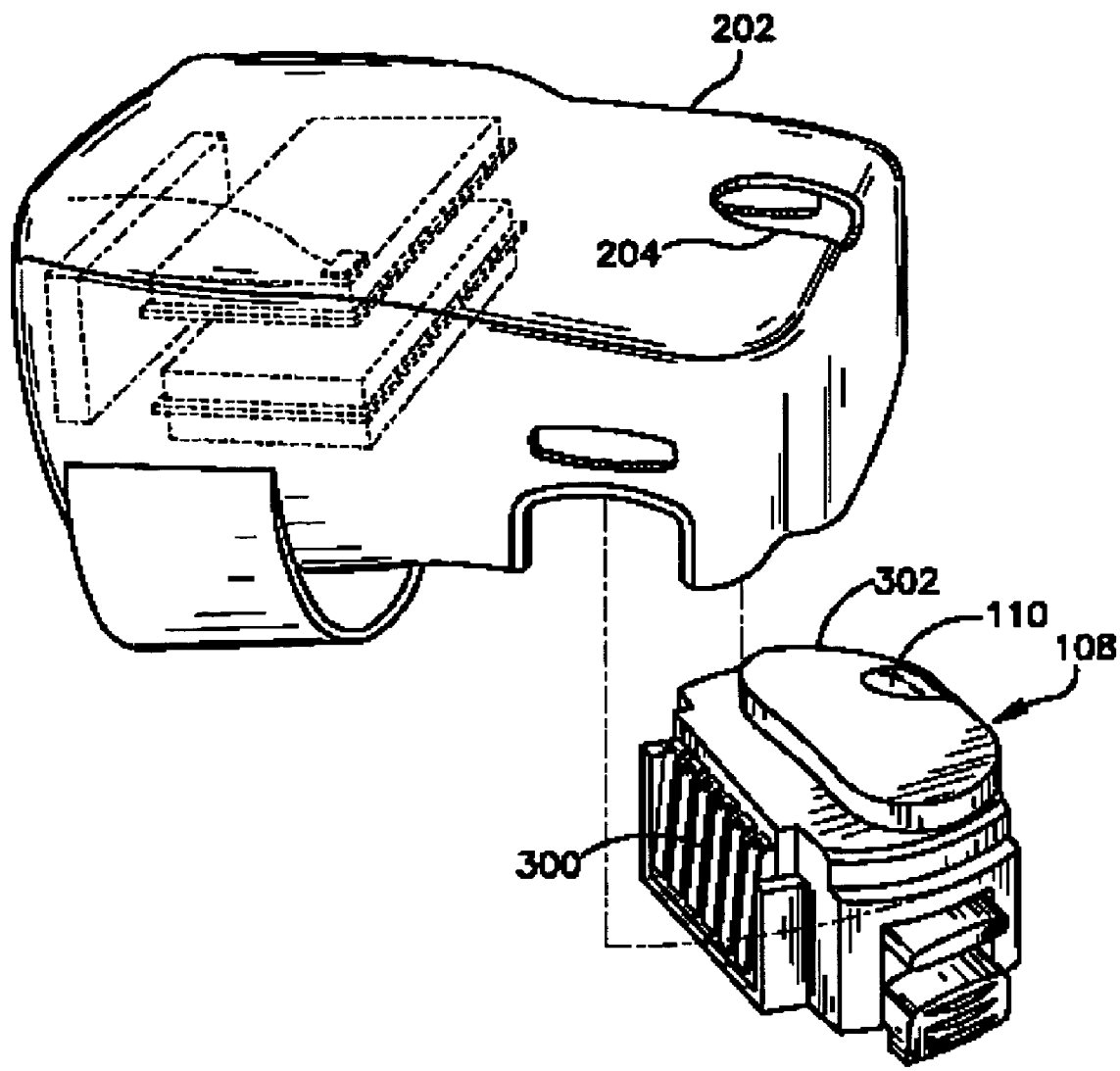
FIG. 7 illustrates a perspective view of a rechargeable power supply in relation to the ring scanner that employs an opportunistic induction according to one aspect of the present invention.

Referring now to FIG. 7, there is illustrated an isometric of the battery pack 108 disengaged from the scanner case 202, according to one particular aspect of the present invention. The battery pack 108 engages the scanner case 202 from underneath, and is position to the rear of the case 202, so that the user perceives both the light and audio signals associated with status of battery pack charge from the rear of the scanner 102 during operation. The battery pack 108 includes an interface connector 300 for electrically interfacing the pack power and charging circuits to the electronics internal to the scanner case 202. Moreover, the battery pack 108 includes the view port 110 that is one end of a focal lens positioned in close proximity to the light sources to substantially focus the emitted light from the light source(s) to viewable lens surface at the outside of a housing 302 of the pack 108. This ensures that the user will see a distinctly colored light according to the respective charge and/or scan status.

Figure 8:
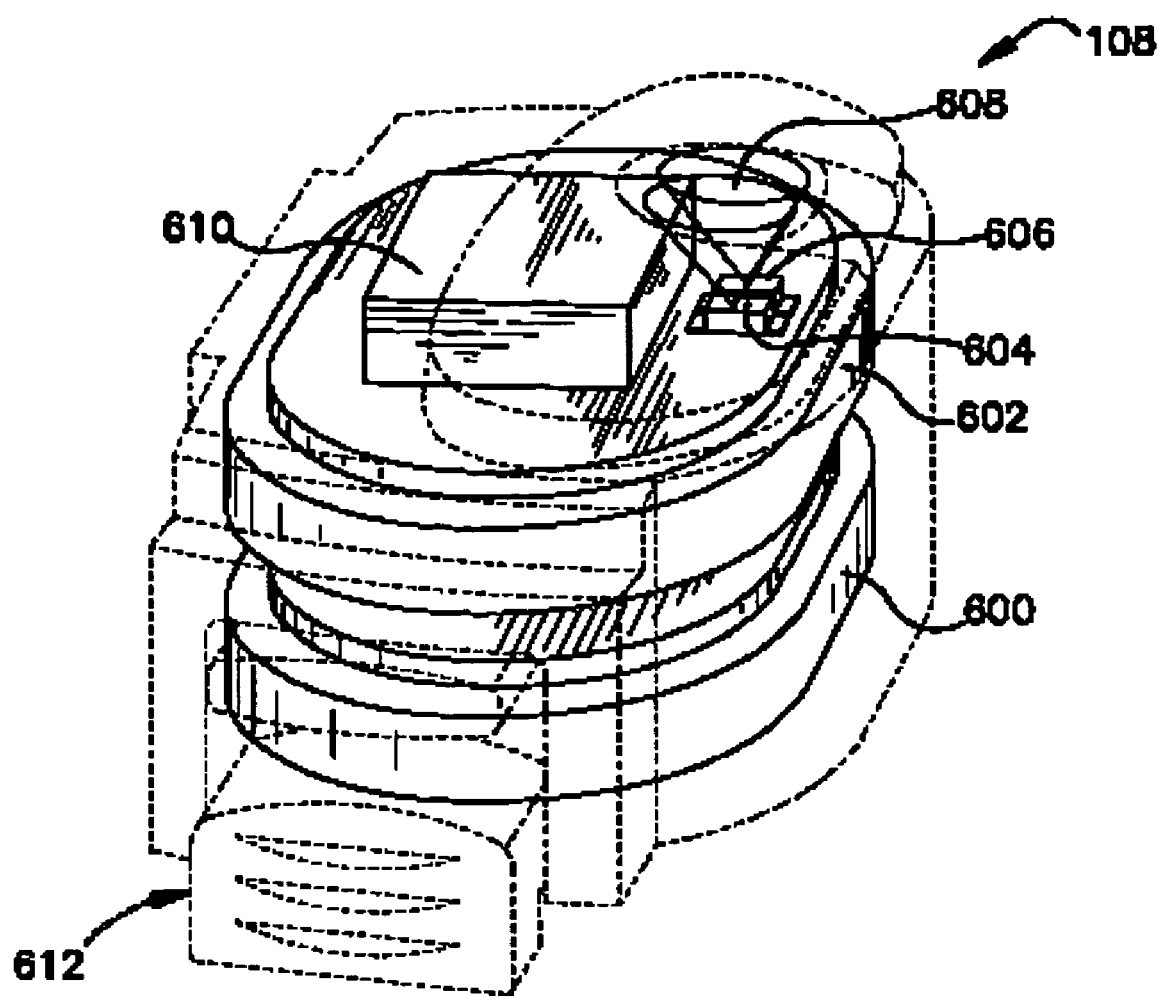
FIG. 8 illustrates perspective view of the rechargeable power supply.

Now referring to FIG. 8, a perspective view of the battery pack 108 is illustrated. In this particular aspect, two rechargeable pancake battery cells 600 and 602 are stacked according to polarity required at electrical interface. In this implementation, the cells 600 and 602 are NiMH cells, yet other suitable battery chemistry can also be employed. The pack 108 can include a light source comprised of two LED elements positioned on top of the uppermost cell 602 in alignment with the view port 110, which elements include a green LED 604 and a red LED 606 for providing the corresponding light when controlled to do so in relationship to charging status. Positioned above the two LED sources 604 and 606 is a focal lens 608 having the one end that is viewable through the housing 202 of FIG. 7. The viewable end of the lens 608 has a convex curvature so that lens extends slightly above the housing surface. This facilitates visual feedback of the emitted light from most angles in which the hand may be oriented during use of the scanner 102 and battery pack 108. The pack 108 also includes an audio source 610 (e.g., a magnetic audio transducer) positioned in front of the LED sources (604 and 606) to emit the audio signal upwardly and rearward from inside the pack housing 302 while engaged in the scanner case 202, so that the user can hear the audio signals. The pack housing 302 also includes a pair of slightly compressible thumb latches 612 (similar to latches 208) located on either end of the length for engaging the pack 108 into the scanner case 202. The rechargeable cells 600 and 602, LEDs 604 and 606, and audio sources 610 connect electrically to the interface connector 300 for powering the scanner electronics and receiving control signals therefrom.

Figure 9:
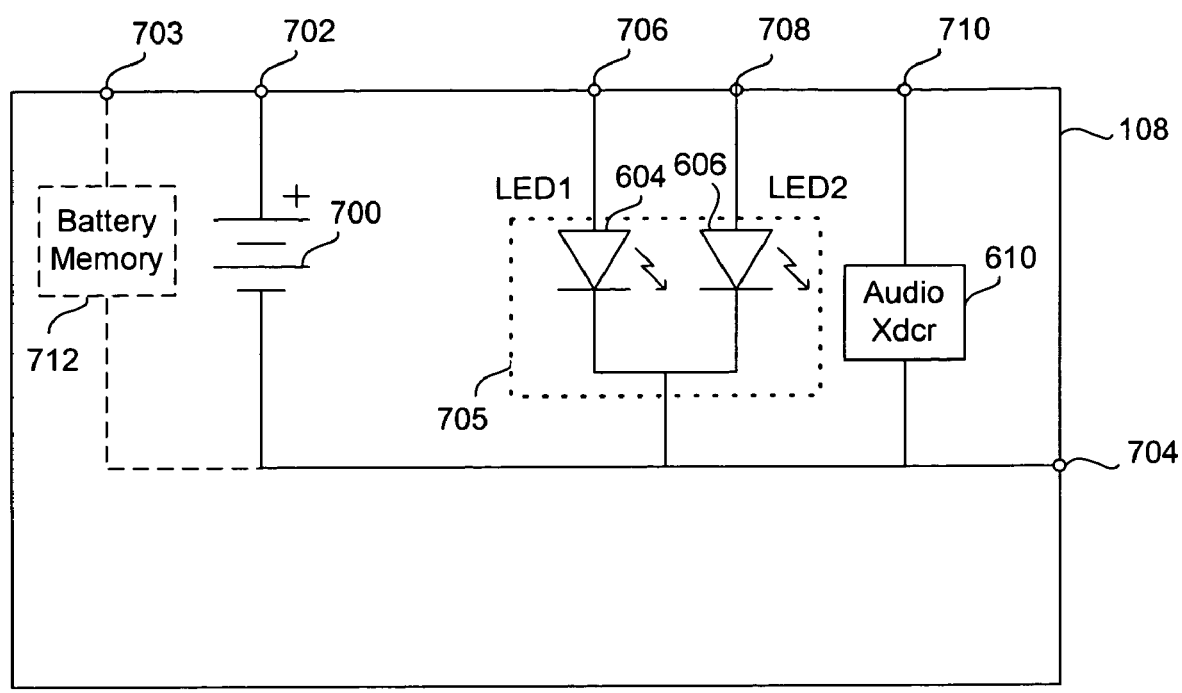
FIG. 9 illustrates a partial circuit diagram for selective components of the rechargeable power supply.

Referring now to FIG. 9, there is illustrated a circuit diagram for the rechargeable power supply of a portable unit in accordance with one aspect of the present invention. The rechargeable power source 700 includes high and low sides connected to respective terminals 702 and 704 operatively connected to the portable unit. A light source 705 includes LEDs 604 and 606, each of which has its anode connected to respective connector terminals 706 and 708, and the cathodes tied at a common node, which common node is the low side terminal 704 of the power source 700. The audio transducer 610 has connects on one side to an input audio terminal 710 of the connector 300 and the low side terminal 704. Thus, in one aspect of the present invention upon depletion of the power source 700, power is supplied from an induction circuit (not shown) with an induction created current to the rechargeable power supply 700 via the terminals 702 and 704. In addition, the LEDs can be controlled on and off individually from a controller (not shown) of the charger system via respective terminals 706 and 708; and, the audio transducer 610 can be controlled on and off (and different tonal frequencies) by the control circuit of the control via respective terminals 710 and 704.

Optionally, a battery memory 712 may be incorporated into the battery pack 108 to retain data unique to power source, and user's behavior for opportunistic charging of power source 700. The battery memory 712 can be a non-volatile memory having a communication port 703 for receiving power and signals from a processor of the scanner 102, and for read/write of data back from/to the processor. The memory 712 also connects to the low side port 704. Stored data can include number of recharges, frequency of recharges, discharge rate, predicted remaining capacity, depletion alarm so that the device processor can produce shutdown alerts to any combination of the LEDs and audio transducer to warn the user that a recharge is required.

Figure 10:
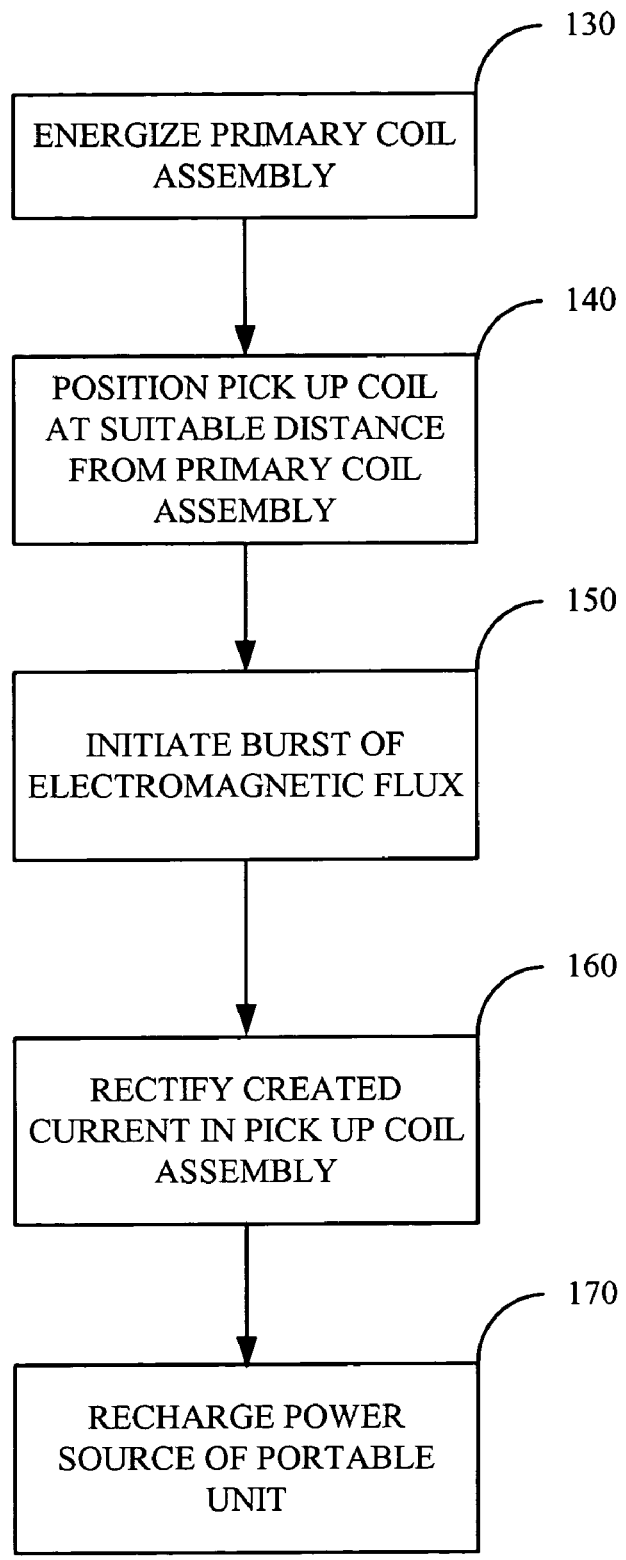
FIG. 10 illustrates a flow chart for a methodology according to one aspect of the present invention.

FIG. 10 illustrates a methodology according to one aspect of the present invention. At 130 the primary coil assembly is being energized via a primary battery source. As explained supra, such primary coil and battery source can be worn around a user's waist. Next and at 140, a secondary pick up coil associated with the portable unit is suitably positioned at a distance with respect to the charged primary coil, so that a magnetic flux can be induced in the pick up coil. Such induced magnetic flux can occur as a burst at a predetermined time interval, as shown at 150, which can be designated by the controller of the charging system. At 160 an induced alternative current in the pick up coil is rectified and employed for charging a power source of the portable unit at 170.

Figure 11:
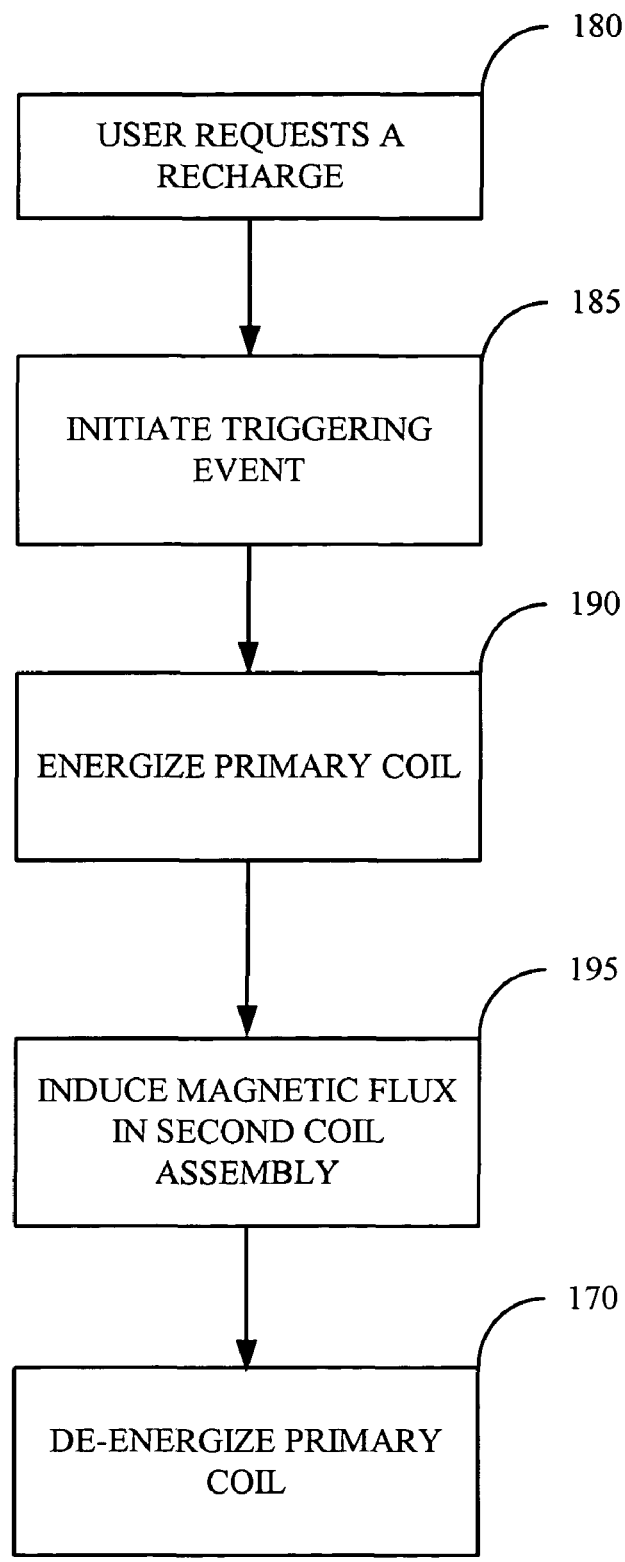
FIG. 11 illustrates a flow chart according to one aspect of the present invention.

Another aspect of a methodology according to the present invention is illustrated in FIG. 11. At 180 a user of a portable unit requests battery of a portable unit to be charged. Such request can for example be in response to a notification by controller of the charging system, or at a user's preference. At 185, the user activates a triggering event for the controller as to charge the primary coil assembly. Such triggering event can include, for example, one based on a user's arm motion in waving the portable unit in front of the charging assembly. Such triggering event relates to the opportunistic feature of charging the rechargeable power source. Put differently, while employing the portable unit, its power source gradually becomes depleted. By incorporating a predetermined opportunistic act into the user's behavior when employing the unit, e.g., moving the portable unit in the direction of the charger or placing the portable unit in a suitable distance from the charger, the present invention provides for an immediate and expedient partial or full charge of the rechargeable power supply. Such expedient behavior of the user at various times periodically recharges the power supply and provides for desired battery life, as long as user continues with the opportunistic recharging behavior. The opportunistic behavior can be during periods of non use of the device, as well as simultaneously with periods of active use of the device. In other words, a user need not deactivate the portable unit during the opportunistic recharge intervals.

Next, at 190 the primary coil is energized and a magnetic fluxed is induced in the pick up coil circuit of the portable unit at 195. The energizing of the primary coil and subsequent induction of the pick up coil can occur as a burst, when the portable unit reaches a predetermined distance, e.g., up to 3" from the charger assembly. The primary coil is then de-energized, in anticipation of the next round of recharging. Such opportunistic re-charging enables a portable unit to operate by employing a substantially small power supply component.

While the exemplary method is illustrated and described herein as a series of blocks representative of various events and/or acts, the present invention is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, any be required to implement a methodology in accordance with the present invention. Moreover, it will be appreciated that the exemplary method and other methods according to the invention may be implemented in association with the method illustrated and described herein, as well as in association with other systems and apparatus not illustrated or described.

In another aspect of the present invention, the controller and the charging system can be part of a holster or a back pack that carries the portable unit. For example, several charging assemblies, having various configurations, such as a flat pad, cylindrical and other three-dimensional or planar shapes can be provided as part of a vest or back pack, e.g., a military back pack, for recharging portable units that needs to be carried by a military personnel. Such back pack can include a main power source and a controller, as described supra, with a soldier placing each portable unit at a respective location in the back pack and opportunistically charge them during such period. In a related aspect of the present invention, one member of the group can serve as the carrier of the recharging system, with other members of the group approaching such carrier whenever a respective recharge is required.

According to another aspect of the present invention, both the rechargeable power unit and the primary power supply may employ other scavenging techniques such as body heat, foot pressure, solar energy, and the like for recharging their respective power supply for recharge. For example, the primary power supply employed for energizing the primary coil can be energized via a thermopile including a plurality of thermocouples connected in series, each thermocouple having a hot junction for receiving heat energy from a user's body part, a cold junction exposed to the atmosphere and a component for maintaining a temperature differential between the hot and cold junctions, and a thin electrically insulating film between the hot junction and the user's body part, whereby body heat energy is converted to electrical power.

Figure 12:
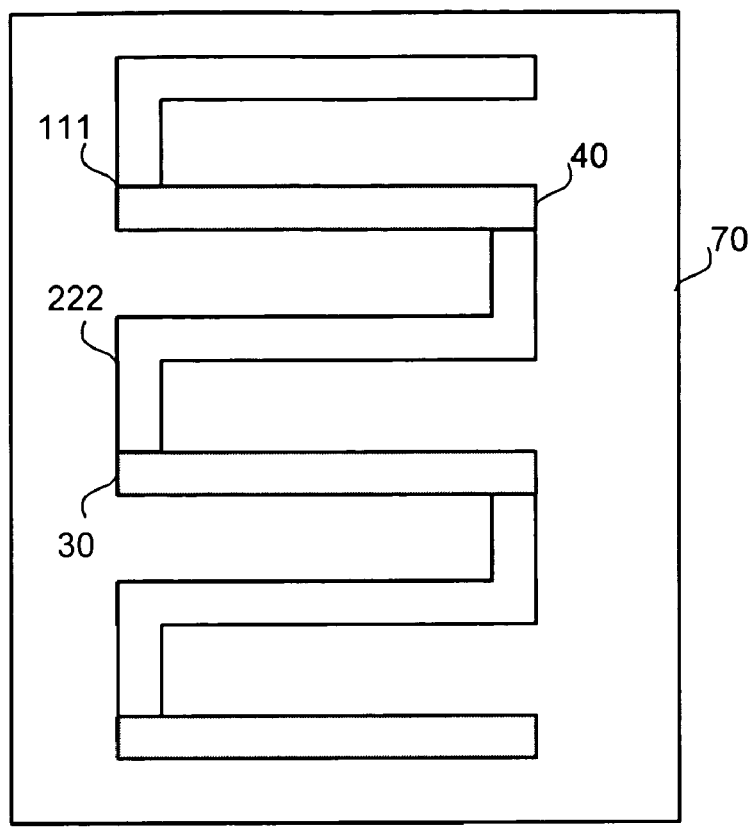
FIG. 12 illustrates a schematic top view of a thermo-coupling arrangement for attachment to a user's body according to the scavenging mode of the present invention.
Figure 13:
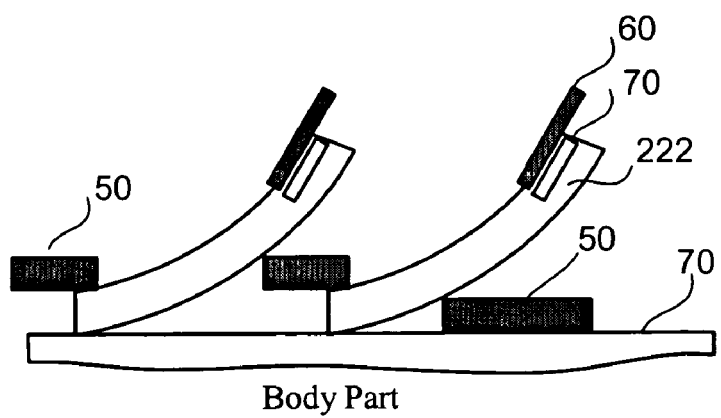
FIG. 13 illustrates a schematic side view for selective components of the thermo-coupling arrangement of FIG. 12.

FIGS. 12 and 13 illustrate a schematic top and side view of a thermo-coupling arrangement as part of the scavenging mode of the present invention. As illustrated, the thermopile comprises a series of thermocouples made from dissimilar metals 111 and 222, for example, copper/constantan (a copper/nickel alloy containing from 40 to 45% nickel, the balance being copper); silicon/germanium or nickel/chromium. Semiconductor materials may also be employed for such assembly. The thermocouples can be connected in series in a cascading or interleafing arrangement, as to minimize space and to permit the stacking of a plurality of thermocouples in a small space. Such arrangement also facilitates manufacture in a sheet format.

The thermocouples operate by maintaining a temperature differential between the hot and cold junctions 30 and 40, respectively. This is an application of the Seebeck Effect. A thermal insulator 50, of low thermal conductivity, e.g., in the form of a ceramic film or a ceramic foam can also be provided to retain the heat in the hot junction. In addition, a thermal conductor or a heat sink 60, such as a foil of high thermal conductivity is also provided as shown in FIG. 13 to conduct heat away from the cold junction. This maximizes the temperature differential. When the heat conductor 60 is also electrically conducting, an additional very thin electrically insulating film 70 can be provided between the layer 60 and the thermocouples 111, 222. Examples of useful thermal conducting foil materials include silver, copper and aluminum. A very thin electrically insulating film material 70 is interposed between a user's warm body part 80 and the heat receiving surface of the thermocouple (hot junction) 30, to prevent shorting and to provide protection from damaging the device. Such an arrangement can be employed for a scavenging mode and providing additional power to main power supply and/or power supply of the portable unit. Other methods via employment of MEMS technology can also be employed.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. As used in this application, the term "component" can also refer to a computer-related entity, either hardware, a combination of hardware and software, software, or software in execution. For example, a component may be, but is not limited to, a process running on a processor, a processor, an object, an executable, a thread of execution, a program, and a computer. Furthermore, to the extent that the terms "includes", "including", "has", "having", and variants thereof are used in either the detailed description or the claims, these terms are intended to be inclusive in a manner similar to the term "comprising."

What is claimed is:

1. A portable computing device, comprising:
   a component that receives an electro-magnetic flux generated from an external source; and
   a charging component that generates a charging current from the flux, and charges a rechargeable power supply; and
   a controller that determines a first charging time for the portable computing device and allocates a second charging time to the portable computing device.

2. The portable computing device of claim 1 further comprising a bar code scanner.

3. The portable computing device of claim 1 further comprising an artificial intelligence (AI) component that infers and/or determines when the power supply should be recharged.

4. The portable computing device of claim 3 further comprising a notification component that notifies a user of the device that the device should be exposed to the external flux source.

5. The portable computing device of claim 1, the rechargeable power source being at least one of a fuel cell, a capacitor, a super capacitor, and a rechargeable battery cell.

6. The portable computing device of claim 1, further comprising: a notification component that alerts a user of power status of the rechargeable power supply.

7. A method of charging a portable unit comprising:
   allocating a charge time to charge a rechargeable power supply of the portable unit;
   providing at least one primary induction assembly with a primary winding configured to create a magnetic flux;
   providing a second pick up induction assembly coupled to a the rechargeable power supply of a the portable unit; unit, the magnetic flux extendable in to the second pick up induction assembly; and
   opportunistically recharging the power supply based at least in part on the charge time via a current created in the second induction assembly from the magnetic flux.

8. The method of claim 7, further comprising: opportunistically recharging the power supply without deactivating the portable unit.

9. The method of claim 7, further comprising: recharging the power supply, when the magnetic flux extends in to the second pick up assembly.

10. The method of claim 7, further comprising: controlling at least one of the primary induction and the secondary induction assembly.

11. The method bf claim 10, further comprising: triggering an event to energize the primary winding.

12. The method of claim 11, the triggering further comprising:
   varying a light feature.

13. The method of claim 11, the triggering further comprising:
   moving a user's body part in a predetermined manner.

14. The method of claim 7, further comprising: charging the rechargeable power supply via a scavenging method employing at least one of a user's body heat, user's foot pressure, and solar energy.

15. The method of claim 7, further comprising: aligning the second induction assembly in close spatial proximity to the first induction assembly.

16. The method of claim 7 further comprising:
   carrying the first induction assembly by a member of a group; and
   approaching the member when an opportunistic recharge is required for portable units of other members.

17. A charging system for a portable unit comprising:
   a controller that determines a charging time for a rechargeable power source of the portable unit and allocates a partial charge time to the rechargeable power source;
   a primary induction assembly with a primary coil coupled to a primary power source; and
   a secondary induction assembly with a secondary coil coupled to a rechargeable power source of the portable unit; the magnetic flux of the first primary induction assembly extendable to the secondary induction assembly so as to provide the rechargeable power source a charging current that is inductively created via the magnetic flux during an opportunistic charging of the portable unit.

18. The charging system of claim 17, a the controller in wireless communication with the portable unit further monitors a state of charge of the rechargeable power source.

19. The charging system of claim 18, the controller comprising a sensor.

20. The charging system of claim 19, the sensor is at least one of a motion and a light sensor.

21. The charger system of claim 17, the rechargeable power source is at least one of a fuel cell, a capacitor, a super capacitor, and a rechargeable battery cell.

22. The charger system of claim 17, at least one of the portable unit and the charger system is wearable around a user's body.

23. The charger system of claim 18, further comprising: a notifying system that alerts a user of a power status of the rechargeable power supply.

24. The charger system of claim 18, the primary induction assembly is part of a flat pad.

25. The charger system of claim 22, further comprising: a thermo-coupler connected to a user's body for additionally recharging at least one of the primary power source and the rechargeable power source.

26. A charger system comprising:
- means for allocating disparate charge times to at least two portable units;
- means for creating a magnetic flux; and
- means for receiving a magnetic flux, the receiving means operatively connected to a rechargeable power source of each of the at least two portable unit units so as to create an electric current during an opportunistic charge of the at least two portable unit units.

* * * * *

UNITED STATES PATENT AND TRADEMARK OFFICE
CERTIFICATE OF CORRECTION

PATENT NO. : 7,872,444 B2  
APPLICATION NO. : 10/733221  
DATED : January 18, 2011  
INVENTOR(S) : Hamilton et al.

Page 1 of 1

It is certified that error appears in the above-identified patent and that said Letters Patent is hereby corrected as shown below:

In Column 14, Line 25, in Claim 11, delete "bf" and insert -- of --, therefor.

Signed and Sealed this
Seventh Day of August, 2012

David J. Kappos
*Director of the United States Patent and Trademark Office*